United States Patent
Kovarik, Jr.

(10) Patent No.: US 7,302,708 B2
(45) Date of Patent: Nov. 27, 2007

(54) ENFORCING COMPUTER SECURITY UTILIZING AN ADAPTIVE LATTICE MECHANISM

(75) Inventor: Vincent Joseph Kovarik, Jr., Grant, FL (US)

(73) Assignee: Harris Corporation, Melbourne, FL (US)

( * ) Notice: Subject to any disclaimer, the term of this patent is extended or adjusted under 35 U.S.C. 154(b) by 707 days.

(21) Appl. No.: 10/798,074

(22) Filed: Mar. 11, 2004

(65) Prior Publication Data

US 2005/0204131 A1    Sep. 15, 2005

(51) Int. Cl.
*G06F 7/04* (2006.01)

(52) U.S. Cl. .......................... 726/26; 709/223

(58) Field of Classification Search ................ 709/229, 709/219; 713/201, 166; 726/23
See application file for complete search history.

(56) References Cited

U.S. PATENT DOCUMENTS

| | | | |
|---|---|---|---|
| 5,887,065 A * | 3/1999 | Audebert ..................... 713/172 |
| 5,970,246 A * | 10/1999 | Moughani et al. .......... 717/128 |
| 6,023,765 A | 2/2000 | Kuhn |
| 6,334,121 B1 | 12/2001 | Primeaux et al. |
| 6,345,361 B1 | 2/2002 | Jerger et al. |
| 6,405,202 B1 | 6/2002 | Britton et al. |
| 6,408,391 B1 | 6/2002 | Huff et al. |
| 6,446,077 B2 | 9/2002 | Straube et al. |
| 6,446,206 B1 | 9/2002 | Feldbaum |
| 6,453,418 B1 | 9/2002 | Ooki et al. |
| 2002/0138322 A1 | 9/2002 | Umezawa et al. |
| 2004/0044655 A1* | 3/2004 | Cotner et al. .................. 707/3 |
| 2004/0107345 A1* | 6/2004 | Brandt et al. ................ 713/171 |
| 2004/0123159 A1* | 6/2004 | Kerstens et al. ............ 713/202 |
| 2004/0193891 A1* | 9/2004 | Ollila .......................... 713/182 |
| 2005/0229000 A1* | 10/2005 | Shoji et al. ................. 713/182 |

FOREIGN PATENT DOCUMENTS

WO    WO 03/088018    10/2003

OTHER PUBLICATIONS

Meadows, C., "Extending the Brewer-Nash Model to a Multilevel Context" IEEE, Proceedings of the Symposium on Research in Security and Privacy. Oakland, May 7-9, 1990.
Stickel, M., "Elimination of Inference Channels by Optimal Upgrading" Research in Security and Privacy, 1994, IEEE Computer Society Symposium in Oakland, CA, May 16-18, 2004, IEEE Comput. Soc, pp. 168-174.

(Continued)

*Primary Examiner*—Kambiz Zand
*Assistant Examiner*—Dant Shaifer-Harriman
(74) *Attorney, Agent, or Firm*—Darby & Darby; Robert J. Sacco (57) ABSTRACT

Method and apparatus for ensuring secure access to a computer system (1000). The method can begin with the step of receiving in the computer system a request from an entity (using 1002). The entity can have a predetermined access authorization level for access to a first base node (110) representing an information type (102) or a computer system function (104). The system determines if the access request completes a prohibited temporal access pattern for the entity. The system also compares a minimum access level established for the first base node to the predetermined access authorization level assigned to the entity. Thereafter, the system can grant the access request only if the minimum access level for the first base node does not exceed to the predetermined access authorization level.

17 Claims, 10 Drawing Sheets

OTHER PUBLICATIONS

Denning, D., "A Lattice Model of Secure Information Flow" Communications of the ACM, vol. 19, No. 5, May 1976, pp. 236-243.

Null, L., et al., "A Unified Approach for Multilevel Database Security Based on Inference Engines" SIGCSE Bulletin, ACM, New York, NY Feb. 23, 1989, pp. 108-111.

Samarati, et al., "Access Control: Policies, Models, and Mechanisms" Lecture Notes in Computer Science, Springer Verlag, New York, NY vol. 2171, Jun. 2003, pp. 137-196.

Sandhu, R., "Lattice-Based Access Control Models" Online: URL:http//doi.ieeecomputersociety.org/10.1109/2.241422> retrieved on Oct. 25, 2005.

Brewer, D., et al., "The Chinese Wall Security Policy" Proceedings of the Symposium on Security and Privacy. Oakland, May 1-3, 1989, Washington, IEEE Comp. Soc. Press, US.

Sandhu, R., "The Typed Access Matrix Model" IEEE, Proceedings of the Computer Society Sypmsium on Research in Security and Privacy, Oakland, May 4-6, 1992, Los Alamitos, IEEE Comp. Soc. Press, US., vol. SYMP. 13, pp. 122-136.

* cited by examiner

Fig. 1

Partially Ordered Set with Transitive Closure Table

| POSET | A | B | C | D | dir | exec | del | a | b | c | d | e |
|---|---|---|---|---|---|---|---|---|---|---|---|---|
| A | 1 | 0 | 0 | 0 | 0 | 0 | 0 | 1 | 1 | 0 | 0 | 0 |
| B | 0 | 1 | 0 | 0 | 0 | 0 | 0 | 1 | 1 | 1 | 0 | 0 |
| C | 0 | 0 | 1 | 0 | 0 | 0 | 0 | 0 | 0 | 1 | 0 | 0 |
| D | 0 | 0 | 0 | 1 | 0 | 0 | 0 | 0 | 1 | 0 | 0 | 1 |
| dir | 0 | 0 | 0 | 0 | 1 | 0 | 0 | 0 | 0 | 0 | 1 | 1 |
| exec | 0 | 0 | 0 | 0 | 0 | 1 | 0 | 0 | 0 | 0 | 1 | 1 |
| del | 0 | 0 | 0 | 0 | 0 | 0 | 1 | 0 | 0 | 0 | 0 | 1 |
| a | 0 | 0 | 0 | 0 | 0 | 0 | 0 | 1 | 1 | 0 | 0 | 0 |
| b | 0 | 0 | 0 | 0 | 0 | 0 | 0 | 0 | 1 | 0 | 0 | 0 |
| c | 0 | 0 | 0 | 0 | 0 | 0 | 0 | 0 | 0 | 1 | 0 | 0 |
| d | 0 | 0 | 0 | 0 | 0 | 0 | 0 | 0 | 0 | 0 | 1 | 1 |
| e | 0 | 0 | 0 | 0 | 0 | 0 | 0 | 0 | 0 | 0 | 0 | 1 |

|   | A | B | C | D | dir | exec | del |
|---|---|---|---|---|---|---|---|
| a | 1 | 1 | 0 | 0 | 0 | 0 | 0 |
| b | 1 | 1 | 0 | 1 | 0 | 0 | 0 |
| c | 0 | 1 | 1 | 0 | 0 | 0 | 0 |
| d | 0 | 0 | 0 | 0 | 1 | 1 | 0 |
| e | 0 | 0 | 0 | 1 | 1 | 1 | 1 |

Fig. 2B

Temporal Order Table (TOT)

| TOT | A | B | C | D | dir | exec | del |
|---|---|---|---|---|---|---|---|
| a | | | | | | | |
| b | | | | | | | |
| c | | | | | | | |
| d | | | | | | 1 | 2 | |
| e | | | | | 1 | 2.1 | 2.2 | 3 |

Fig. 3

Process/User Access Table (PUAT)

| Usr | A | B | C | D | dir | exec | del |
|---|---|---|---|---|---|---|---|
| 1(1) | 0 | 1 | 0 | 2 | 0 | 2 | 1 |
| 2(1) | 0 | 1 | 0 | 2 | 0 | 2 | 1 |
| 3(2) | 0 | 1 | 0 | 2 | 0 | 2 | 1 |
| 4(1) | 0 | 1 | 0 | 2 | 0 | 2 | 1 |
| 5(3) | 0 | 1 | 0 | 2 | 0 | 2 | 1 |

Fig. 4A

Temporal Access Table (TAT)

| Usr | A | B | C | D | dir | exec | del |
|---|---|---|---|---|---|---|---|
| 1(1) | | | | | 102 | 112 | |
| 2(1) | | | | | | | |
| 3(2) | | | | | 111 | 103 | |
| 4(1) | | | | | | | |
| 5(3) | | | | | | | |

Fig. 4B

Combinatorial Classification Table (CCT)

| CCT | A | B | C | D | dir | exec | del |
|---|---|---|---|---|---|---|---|
| a | 2 | 2 | 0 | 0 | 0 | 0 | 0 |
| b | 3 | 3 | 0 | 3 | 0 | 0 | 0 |
| c | 0 | 3 | 3 | 0 | 0 | 0 | 0 |
| d | 0 | 0 | 0 | 0 | 3 | 3 | 0 |
| e | 0 | 0 | 0 | 5 | 5 | 5 | 5 |

| Usr | A | B | C | D | dir | exec | del |
|---|---|---|---|---|---|---|---|
| 1(1) | 0 | 1 | 0 | 2 | 0 | 2 | 1 |
| 2(1) | 0 | 1 | 0 | 2 | 0 | 2 | 1 |
| 3(2) | 0 | 1 | 0 | 2 | 0 | 2 | 1 |
| 4(1) | 0 | 1 | 0 | 2 | 0 | 2 | 1 |
| 5(3) | 0 | 1 | 0 | 2 | 0 | 2 | 1 |

Fig. 8B

| TOT | A | B | C | D | dir | exec | del |
|---|---|---|---|---|---|---|---|
| a |  |  |  |  |  |  |  |
| b |  |  |  |  |  |  |  |
| c |  |  |  |  |  |  |  |
| d |  |  |  |  | 1 | 2 |  |
| e |  |  |  | 1 | 2.1 | 2.2 | 3 |

Fig. 8C

| CCT | A | B | C | D | dir | exec | del |
|---|---|---|---|---|---|---|---|
| a | 2 | 2 | 0 | 0 | 0 | 0 | 0 |
| b | 3 | 3 | 0 | 3 | 0 | 0 | 0 |
| c | 0 | 3 | 3 | 0 | 0 | 0 | 0 |
| d | 0 | 0 | 0 | 0 | 3 | 3 | 0 |
| e | 0 | 0 | 0 | 5 | 5 | 5 | 5 |

Fig. 8D

| Usr | A | B | C | D | dir | exec | del |
|---|---|---|---|---|---|---|---|
| 1(1) | 0 | 1 | 0 | 2 | 0 | 2 | 1 |
| 2(1) | 0/1 | 2 | 0 | 2 | 0 | 2 | 1 |
| 3(2) | 0 | 1 | 0 | 2 | 0 | 2 | 1 |
| 4(1) | 0 | 1 | 0 | 2 | 0 | 2 | 1 |
| 5(3) | 0 | 1 | 0 | 2 | 0 | 2 | 1 |

Fig. 8E

| TOT | A | B | C | D | dir | exec | del |
|---|---|---|---|---|---|---|---|
| a |  |  |  |  |  |  |  |
| b |  |  |  |  |  |  |  |
| c |  |  |  |  |  |  |  |
| d |  |  |  |  | 1 | 2 |  |
| e |  |  |  | 1 | 2.1 | 2.2 | 3 |

Fig. 9A

| Usr | A | B | C | D | dir | exec | del |
|---|---|---|---|---|---|---|---|
| 1(1) | 0 | 1 | 0 | 2 | 0 | 2 | 1 |
| 2(1) | 0 | 1 | 0 | 2 | 0 | 2 | 1 |
| 3(2) | 0 | 1 | 0 | 2 | 0 | 2 | 1 |
| 4(1) | 0 | 1 | 0 | 2 | 0 | 2 | 1 |
| 5(3) | 0 | 1 | 0 | 2 | 0 | 2 | 1 |

Fig. 9B

| TOT | A | B | C | D | dir | exec | del |
|---|---|---|---|---|---|---|---|
| a | | | | | | | |
| b | | | | | | | |
| c | | | | | | | |
| d | | | | | | 1 | 2 |
| e | | | | | 1 | 2.1 | 2.2 | 3 |

Fig. 9C

| CCT | A | B | C | D | dir | exec | del |
|---|---|---|---|---|---|---|---|
| a | 2 | 2 | 0 | 0 | 0 | 0 | 0 |
| b | 3 | 3 | 0 | 3 | 0 | 0 | 0 |
| c | 0 | 3 | 3 | 0 | 0 | 0 | 0 |
| d | 0 | 0 | 0 | 0 | 3 | 3 | 0 |
| e | 0 | 0 | 0 | 5 | 5 | 5 | 5 |

Fig. 9D

| Usr | A | B | C | D | dir | exec | del |
|---|---|---|---|---|---|---|---|
| 1(1) | 0 | 1 | 0 | 2 | 0 | 2 | 1 |
| 2(1) | 0 | 1 | 0 | 2 | 0 | 2 | 1 |
| 3(2) | 0/1 | 2 | 0 | 2 | 0 | 2 | 1 |
| 4(1) | 0 | 1 | 0 | 2 | 0 | 2 | 1 |
| 5(3) | 0 | 1 | 0 | 2 | 0 | 2 | 1 |

Fig. 9E

| TOT | A | B | C | D | dir | exec | del |
|---|---|---|---|---|---|---|---|
| a | | | | | | | |
| b | | | | | | | |
| c | | | | | | | |
| d | | | | | | 1 | 2 |
| e | | | | | 1 | 2.1 | 2.2 | 3 |

Fig. 9F

| CCT | A | B | C | D | dir | exec | del |
|---|---|---|---|---|---|---|---|
| a | 2 | 2 | 0 | 0 | 0 | 0 | 0 |
| b | 3 | 3 | 0 | 3 | 0 | 0 | 0 |
| c | 0 | 3 | 3 | 0 | 0 | 0 | 0 |
| d | 0 | 0 | 0 | 0 | 3 | 3 | 0 |
| e | 0 | 0 | 0 | 5 | 5 | 5 | 5 |

Fig. 9G

| Usr | A | B | C | D | dir | exec | del |
|---|---|---|---|---|---|---|---|
| 1(1) | 0 | 1 | 0 | 2 | 0 | 2 | 1 |
| 2(1) | 0 | 1 | 0 | 2 | 0 | 2 | 1 |
| 3(2) | 0/1 | 3 | 0 | 2/2 | 0 | 2 | 1 |
| 4(1) | 0 | 1 | 0 | 2 | 0 | 2 | 1 |
| 5(3) | 0 | 1 | 0 | 2 | 0 | 2 | 1 |

Fig. 9H

| TOT | A | B | C | D | dir | exec | del |
|---|---|---|---|---|---|---|---|
| a | | | | | | | |
| b | | | | | | | |
| c | | | | | | | |
| d | | | | | | 1 | 2 |
| e | | | | | 1 | 2.1 | 2.2 | 3 |

Fig. 10

ENFORCING COMPUTER SECURITY UTILIZING AN ADAPTIVE LATTICE MECHANISM

BACKGROUND OF THE INVENTION

1. Statement of the Technical Field

The inventive arrangements relate generally to computer and information security and more particularly to security measures that enforce security based on logical implementation methods.

2. Description of the Related Art

Control of access to information and computer system resources is a continuing problem for system, database, and network administrators across the government, military, and private industry. Providing system security in such multi-user environments requires a balance between permitting access to resources necessary to perform the business functions for the enterprise and limiting access. Current security methods fall within two basic categories. These include physical and logical implementation methods.

Methods for implementing logical security safeguards typically provide access based on a user/group/role identifier and an access control list for the file, database, or system function to be accessed. However, there are a number of serious limitations to such an approach, primarily because control over information access is limited to a simple relational comparison. Significantly, such systems do not enforce security based on patterns of behavior, aggregation of data, or information clustering. Further, conventional systems make use of simple point tests which do not support the ability to look at temporal patterns of access.

For example, U.S. Pat. No. 6,453,418 to Ooki et al. concerns a method for accessing information. The invention addresses some aspects of accessing portions of information based on user access authority. However, the invention makes no use of access patterns or temporal activities to control access.

U.S. Pat. No. 6,446,077 to Straube et al. concerns an inherited information propagator for objects. The invention utilizes an inheritance graph to propagate changes in security descriptors to affected objects. The invention focuses on the propagation of security tagging but does not address the process of enforcing the security policy and does not mention aggregation or temporal patterns.

U.S. Pat. No. 6,334,121 to Primeaux et al. concerns a usage pattern based user authenticator. The system utilizes a neural network and a set of rules to track usage patterns and flag suspicious activities. This patent focuses on flagging suspicious activity but does not address enforcement of a security policy based on such flagging.

SUMMARY OF THE INVENTION

The invention concerns a method for ensuring secure access to a computer system. The method can involve several steps. The method can begin with the step of receiving in the computer system a request from an entity. The entity can be a user or a process and can have a predetermined access authorization level for access to a first base node representing an information type or a computer system function. The computer system determine if the access request completes a prohibited temporal access pattern for the entity. If so, the request is rejected. Otherwise, the system can compare a minimum access level established for the first base node to the predetermined access authorization level assigned to the entity. Thereafter, the system can grant the access request only if the minimum access level for the first base node does not exceed to the predetermined access authorization level. The method can also include the step of denying the request if the minimum access level for the first base node exceeds the predetermined access authorization level assigned to the entity.

The method can also include logically organizing the computer system in the form of a tree hierarchy having a plurality of leaf nodes and higher-level nodes. A plurality of the base nodes can be defined as comprising respectively a plurality of leaf nodes of the tree hierarchy. Higher-level nodes can be defined as aggregations of the base nodes. Further, the method can include the step of identifying within the hierarchy any higher-level nodes that are aggregations comprising the first base node.

The method can also include identifying within the hierarchy any nodes that directly or indirectly comprise children of any of the higher-level nodes that are aggregations comprising the first base node. The minimum required entity access level can thereafter be updated for any base nodes that directly or indirectly comprise children of any of the higher-level nodes that are aggregations comprising the first base node.

For example the updating step can include comparing the entity's predetermined access authorization level against the minimum required access level of the higher-level nodes that are aggregations comprising the first base node. Thereafter, a minimum required access level of any the base node that is also a member of any aggregation comprising the first base node can be updated if a minimum required access level for the higher-level node comprising the aggregation has a required access level that is higher than the entity's predetermined access level.

DETAILED DESCRIPTION OF THE PREFERRED EMBODIMENTS

The invention concerns a method and system for using an adaptive lattice mechanism to enforce computer security. Data and function access security levels form an initial basis for controlling access. These security access primitives can be organized within a partially ordered set (POSET) so as to define a hierarchical, directed graph. The security access primitives can form base nodes in the hierarchical, directed graph. Higher level nodes within the graph represent information aggregation sets and/or temporal patterns of access. Each of the nodes within the graph can have an associated security level representing the mandatory security level for the particular aggregation or pattern. Access authorities are maintained dynamically for each user/process, thereby allowing system objects to have multiple levels of access classification based on historical access by each user.

Figure 1:
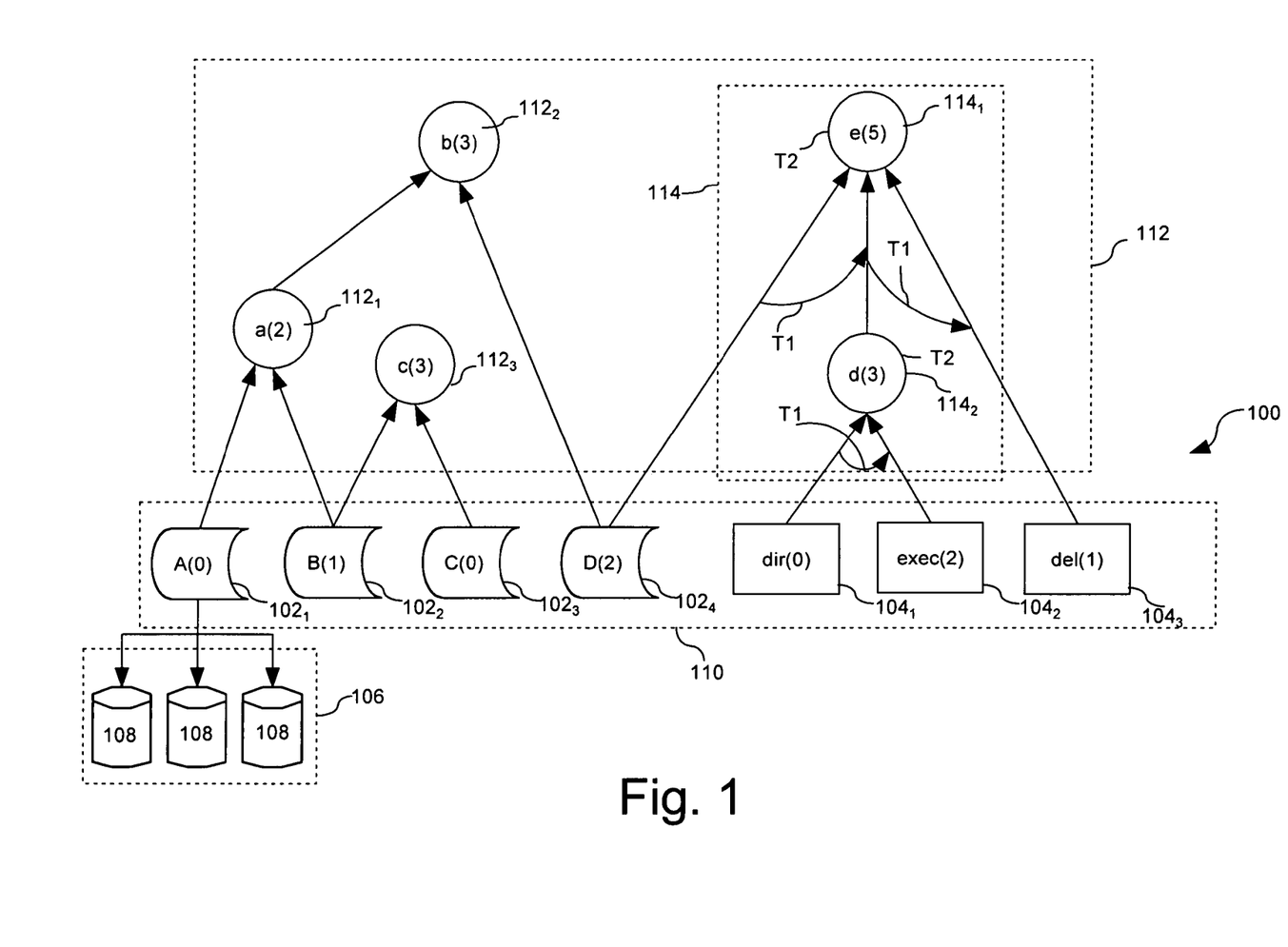
FIG. 1 is a representation of data primitives and hierarchical graph that is useful for understanding the invention.

Referring now to FIG. 1, a secure computer system can comprise a plurality of object types $102_1$-$102_4$ and system functions $104_1$-$104_3$. The object types can include one or more information types A, B, C, D. Instantiations 106 of object types can include multiple type instances 108 as illustrated. Further, each object type can have a minimum required security access level associated therewith. In FIG. 1, the minimum required security access level for each object type $102_1$-$102_4$ is represented in parenthesis along with the letter identifying the information type. For example, object $102_4$ in FIG. 1 is labeled as "D(2)". The number 2 in parenthesis indicates that information type D has a minimum required security access level of two. Any process or user requesting to access any instantiation of object type D must have a security access level greater than or equal to two. Similarly, access to object $102_2$, which is shown as B(1), requires a security access level of one or higher.

The system functions $104_1$-$104_3$ represent functions which can be accessed by a process or user. In FIG. 1, the functions are shown as including directory (dir), execute (exec), and delete (del). However, it should be understood that these are merely intended as some examples of computer system functions, and the invention is not limited to any particular type of computer system function. Similar to the notation described above with respect to object types $102_1$-$102_4$, each system function $104_1$-$104_3$ in FIG. 1 is followed by a number in parenthesis. The number represents a minimum security access level required for any process or user to access that particular function. Thus, for example, the "exec" system function labeled exec(2) requires that a process or user possess a security level of at least two in order to access that function.

The various object types $102_1$-$102_4$ and system functions $104_1$-$104_3$ can be represented in a hierarchical tree graph as shown in FIG. 1. According to one aspect of the invention, the various object types and system functions can be defined as a plurality of leaf or base nodes 110 in the hierarchical tree 100. Further, higher-level nodes 112 can be constructed to represent aggregations of base nodes 110. As illustrated in FIG. 1, higher-level nodes 112 can include aggregations of base nodes 110, as well as higher order aggregations, i.e. aggregations of previously constructed aggregations.

Figure 2A:
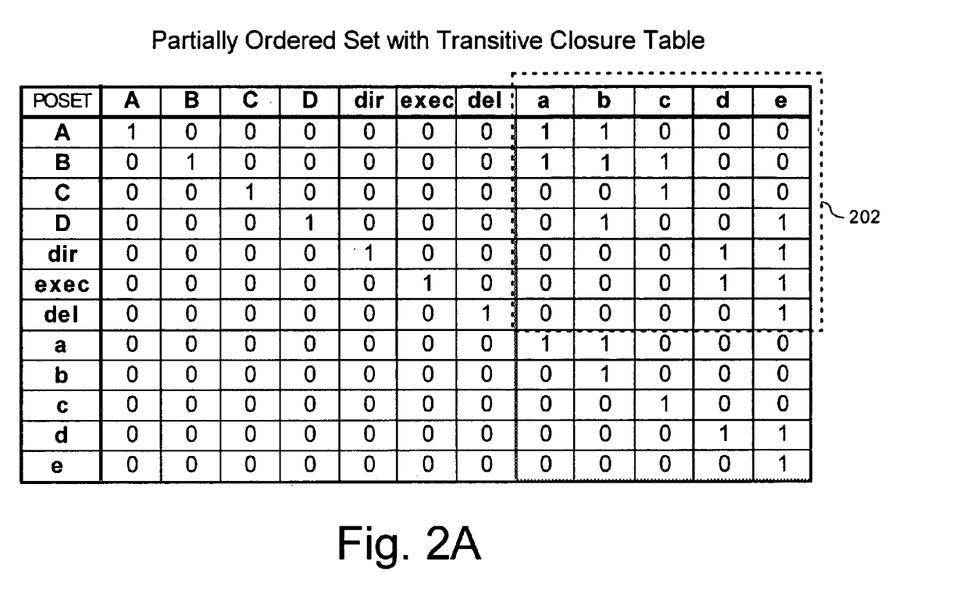
FIG. 2A is an example of a partially ordered set with transitive closure table.

According to one embodiment of the invention, the hierarchical directed graph of FIG. 1 can be implemented by organizing the object types $102_1$-$102_4$ and system functions $104_1$-$104_3$ within a partially ordered set (POSET). A POSET defines relationships that exist between pairs of elements, e.g. x→R→y within a set of elements. Within the set of elements, there exists pairs of elements, e.g. m and n, for which no relation R exists. Thus, the set is partially ordered. Consequently, POSETs may have multiple root and leaf nodes in contrast to a tree structure which has a single root node and multiple leaf nodes. Because of the multiplicity of root nodes representing information access and operational functions for which the security operations are to be enforced, the POSET is used to represent the multiplicity of security relationships. FIG. 2A is an example of such a POSET 200 with a transitive closure table 202 that can be produced for the hierarchical tree 100 in FIG. 1.

Referring again to FIG. 1, it can be seen that relationships can be asserted for temporal access patterns. In this figure the curved arrows labeled T1 denote a temporal ordering between the accesses defined by items $114_1$ and $114_2$. Thus, for item $114_2$, a temporal order is asserted between items $104_1$ and $104_2$, e.g. $104_1$→$104_2$. Thus, node d(3) not only identifies an aggregation of the primitive functions denoted by $104_1$ and $104_2$ but also specifies that an explicit temporal ordering exists in that $104_1$ is accessed before $104_2$. So, for the security policy associated with item $114_2$ to be activated, not only must both $104_1$ and $104_2$ be accessed but they must be accessed in the order indicated by the temporal relationship. In addition to specifying a temporal order of access activities for a single node, temporal relations may be subsumed within other nodes through aggregation. This is illustrated by item $114_1$ in FIG. 1. Item $114_1$ has three access items associated with the node, item $102_4$, $114_2$, and $104_3$. As shown on the diagram, a temporal ordering has been identified that specifies $102_4$→$114_2$→$104_3$. However, item $114_2$ is an aggregation of access operations. Thus the operations identified by item $114_2$ become subsumed into the overall temporal ordering of item $114_1$ and the full temporal order is $102_4$→$104_1$→$104_2$→$104_3$, where item $114_2$ in the original temporal order has been replaced by its constituent parts, $104_1$→$104_2$.

Figure 3:
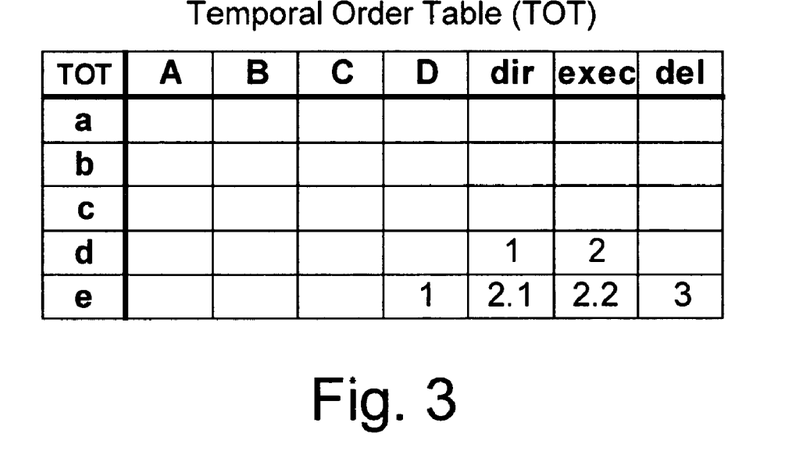
FIG. 3 is an example of a temporal order table.

FIG. 3 is the Temporal Order Table (TOT) that captures the above relationships. The TOT is useful for capturing the relative temporal order of actions and allows relative or approximate temporal pattern matching to identify hostile actions. So, for access to node d, item $114_2$, the table shows that first the dir operation, item $104_1$, is performed, followed by the exec operation, item $104_2$. This ordering is shown in the row labeled "d" with a numerical ordering of the accesses listed in the columns. FIG. 3 further shows that for node e, item $114_1$, the initial access is a data class D, item $102_4$, followed by the constituent elements of node d, item $114_2$, which is the dir, item $104_1$, and exec, item $104_2$, operations. In this case the row labeled "e" stores the order of the accesses using numerical values. In the case of row "e", the inclusion of the access ordering associated with node d, item $114_2$ is shown as 2.1 and 2.2 representing the fact that both accesses are grouped as the second item in the temporal ordering for node e, item $114_1$, and that the order for these grouped items is denoted by the second number after the 2.

Figure 4A:
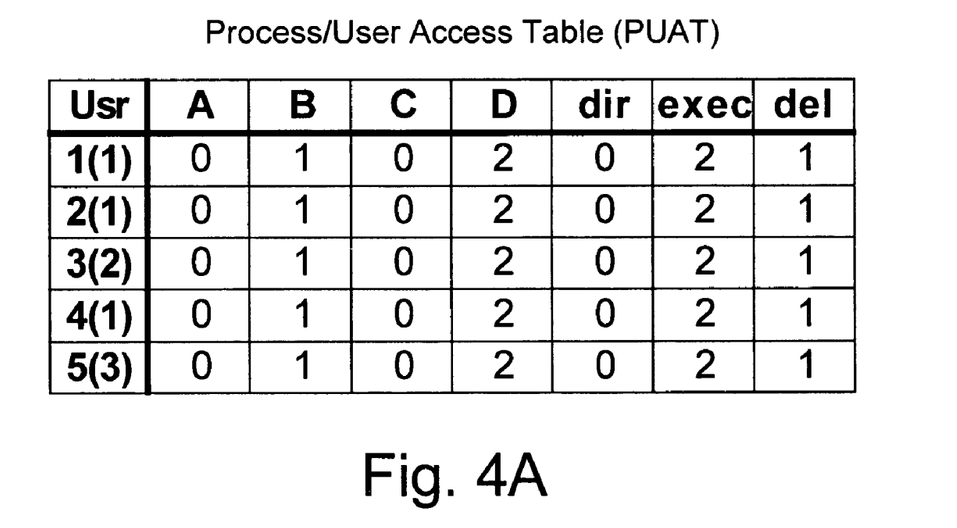
FIG. 4A is an example of a process/user access table.

Referring now to FIG. 4A, there is shown an example of a Process/User Access Table (PUAT) that can be used in the present invention. The PUAT is a table of access authority that shows the minimum security level that each particular process or user is required to have in order to access the object type 102 or system function 104 in FIG. 1. For example, FIG. 3 shows that users 1-5 can be required (at least initially) to possess a security access level of at least one (1) to access information type B. Since users 1-5 in FIG. 4A all have a security access level of at least one (1), this means that all users can, at least initially, access information type B.

Significantly, however, the PUAT is a dynamic table in which the minimum security level required for a particular process or user to access a particular object type 102 or system function 104 can be changed depending on access history and/or identified temporal patterns. In this way, access authorities are maintained dynamically for each user allowing system objects to have multiple levels of access classification based on historical access by a particular process or user.

Figure 2B:
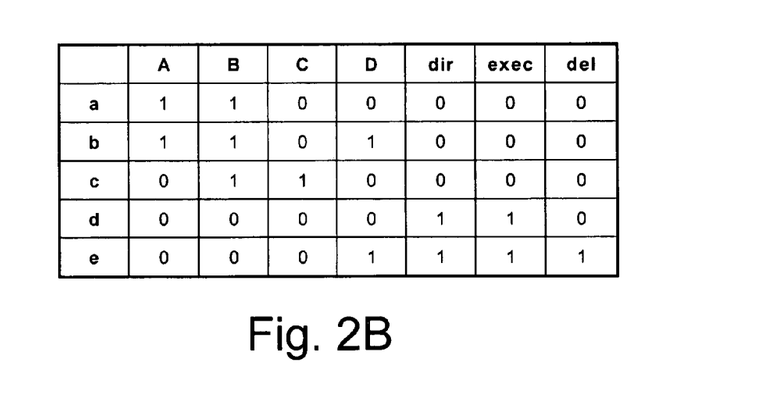
Figure 5:
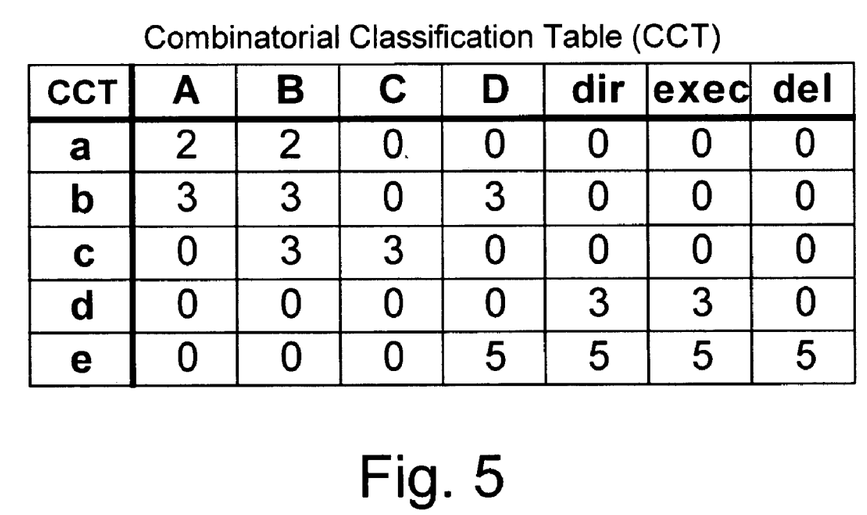
FIG. 5 is an example of a combinatorial classification table.

The transitive closure table of the complete set of access operations and aggregate nodes is illustrated in FIG. 2A. The transitive closure table is obtained by adding a row and column for each of the aggregate nodes to the table of primitive actions. This yields an n-by-n table where the number of columns and rows are equal and the number of rows and columns is equal to the sum of the number primitive operations and number of aggregation nodes. A subset, item 202, of the transitive closure table of the POSET of FIG. 2A is then used to produce a combinatorial classification table (CCT) which is illustrated in FIG. 5. The CCT is obtained by taking the subset of the transitive closure table, item 202, corresponding to the set of aggregations shown in the columns and the primitive operations shown in the rows. This subset identifies the dependencies between the primitive access operations and the aggregations to which they are associated. This subset of the transitive closure, item 202, is then flipped about its diagonal axis yielding the aggregation items, a through e as the rows and the primitive access operations as the columns, as shown in FIG. 2B. Finally, each row is inspected and for each column containing a 1 entry, the number 1 is replaced with the security access level associated with the aggregation. This yields the final CCT as illustrated in FIG. 5.

Figure 6:
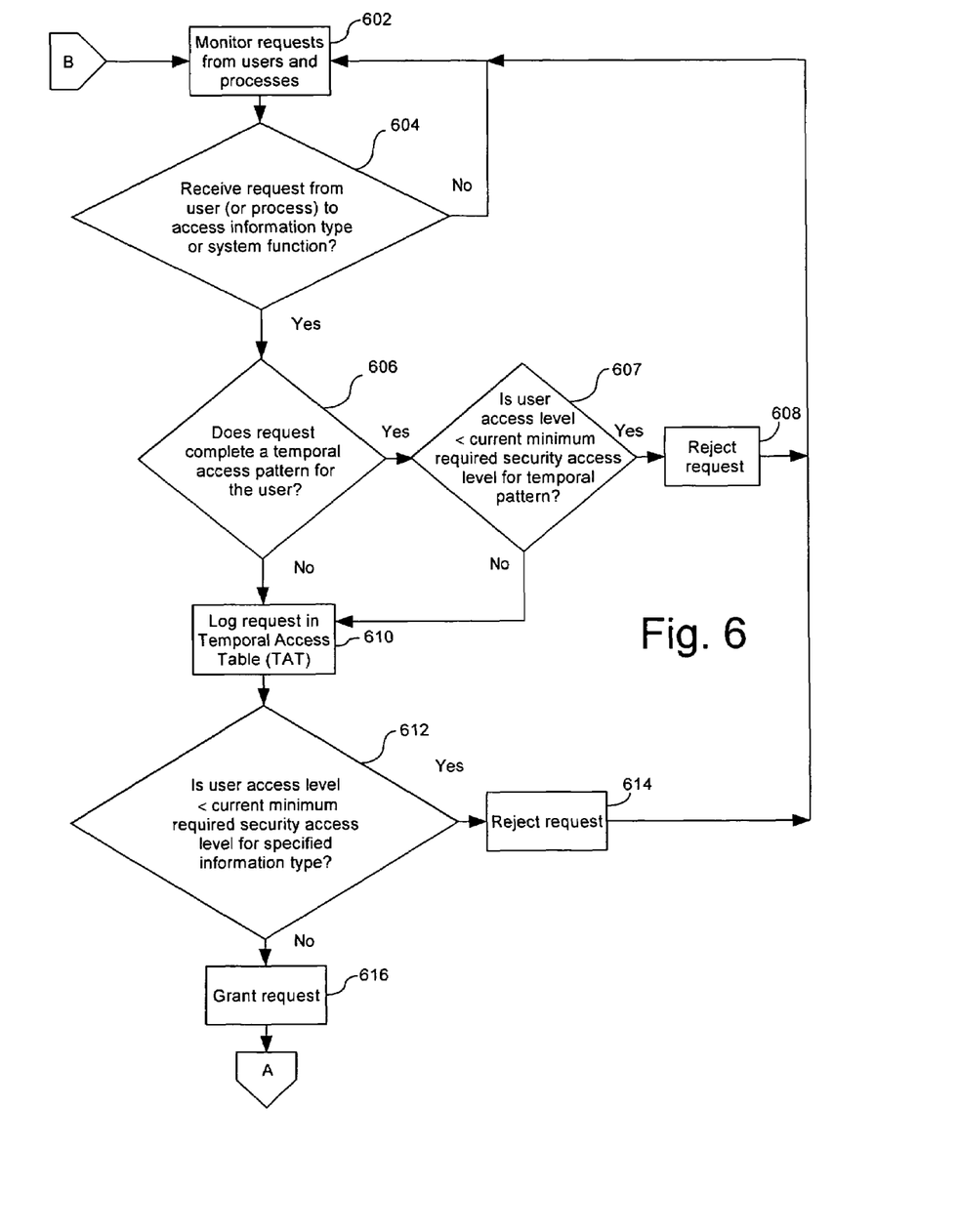
FIG. 6 is a flowchart that is useful for understanding the invention.
Figure 7:
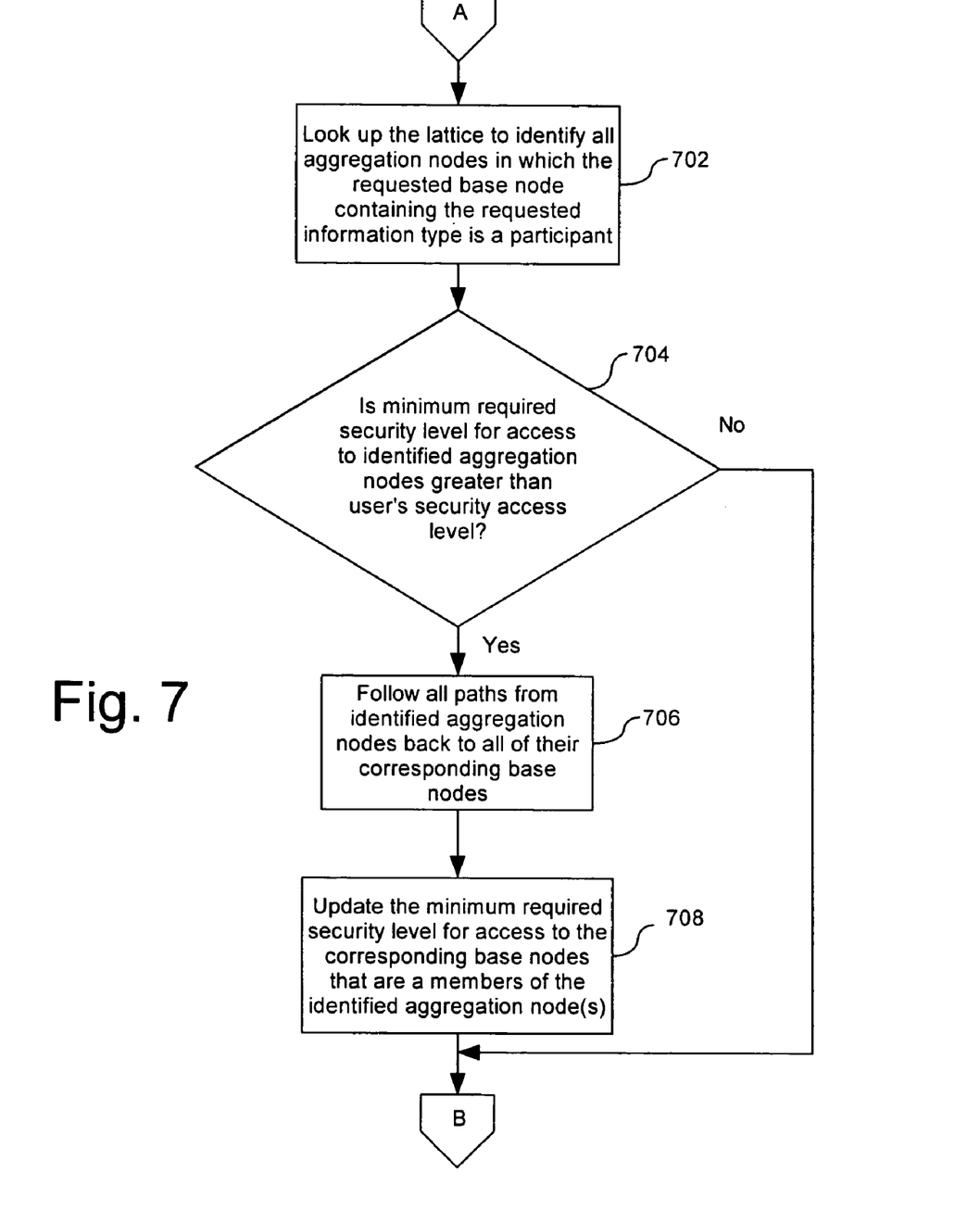
FIG. 7 is a flowchart that is useful for understanding the invention.

A flowchart that is useful for understanding the invention is shown in FIGS. 6 and 7. As illustrated therein, the process can begin in step 602 of FIG. 6 by monitoring requests from computer system users and/or processes. Messages are tested in step 604 to determine if they comprise requests to access an information type or system function. If so, then the system continues on to step 606 to determine if the request completes a temporal access pattern for the particular user. If the request does complete a temporal access pattern, this means that the sequence of operations performed matches an identified pattern and is subject to the security access level specified for the that temporal order. If a temporal pattern is completed, the user's access level is compared to the access level required for the requested access action, illustrated in step 607. Note that the temporal ordering of primitive access operations mandates that the operations occur in the order specified for the security policy to be enforced. Thus, in FIG. 1, if 104$_2$ is accessed first followed by item 104$_1$, the security policy associated with node d, item 114$_2$, will not be activated because the temporal order was not satisfied. If the access level of the user is not sufficient for the requested action, then the request is rejected in step 608.

Figure 4B:
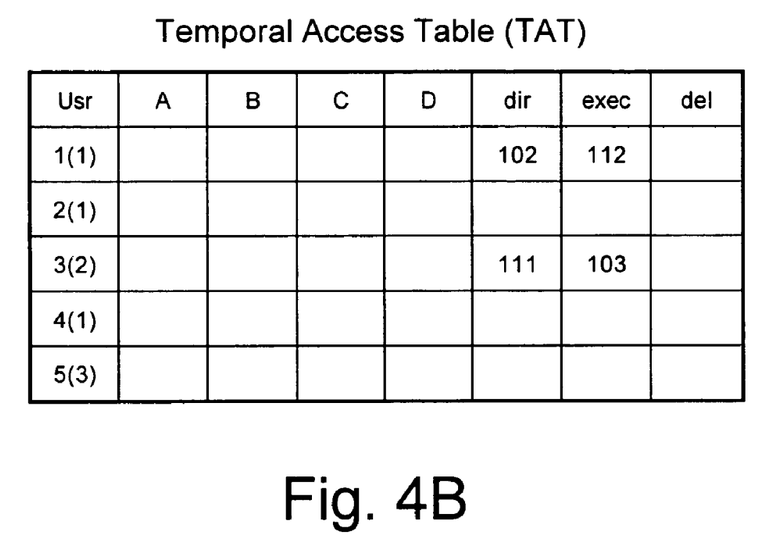

If the request does not complete a temporal access pattern for the particular user or the user's access level is sufficient for the temporal pattern completed, then the system continues on to step 610 and logs the request in the Temporal Access Table (TAT). As shown in FIG. 4B, the Temporal Access Table maintains a history of the primitive operations performed by a user. As a user is granted authorization to perform a primitive access operation, the operation is time-stamped and stored within the TAT. The time stamps are compared against the temporal patterns identified in the Temporal Order Table, FIG. 3, to check for matches. Thus, in FIG. 4B user 1 performed a dir operation at time 102 and then requested an exec operation at time 112. Since 112 is after 102, this request would trigger a match in the Temporal Order Table for node d, item 114$_2$ in FIG. 1, and the request would be denied. However, in the case of user 3, the exec operation was performed at time 103 followed by the dir operation at time 111. This pair does not match the defined temporal order and the operations are permitted.

In step 612, the computer system makes a determination as to whether the security access level of the user making the request is less than the current minimum required security access level for the specified information type. This determination can be completed by reference to the table in FIG. 4A. If the user does not have authorization for at least the current minimum required security access level, then the request is rejected. Alternatively, if the user does have a sufficiently high security access level then the request is granted in step 616.

Aggregation nodes 112 are comprised of two or more nodes which may be base nodes 110, other aggregation nodes 112, or a combination of both base and aggregation nodes. Accordingly, such aggregation nodes will often have a higher minimum required security level for permitting access as compared to security levels required for access to participant information types and/or system functions that comprise base nodes 110. This is true because aggregated data is often of a more sensitive nature since it provides greater context and can identify relationships between the various individual information types. Consequently aggregated information will inevitably be of greater interest to unauthorized users and system administrators will naturally wish to impose higher level restrictions on its access.

Still, it will be appreciated that access to all of the information types or system functions associated with base nodes 110 that are participants in a particular aggregation node is, in many instances, tantamount to directly accessing the aggregation node. Accordingly, it can be desirable to increase a security authorization level necessary for a particular user or process to access certain information types once the user or process has accessed certain other information types. For example, this may be true in those instances where both of the data types are participants in a common aggregation node. In such instances, it can be desirable to increase the required security authorization level for a particular user to access a base node to be at least equal to the security authorization level of an aggregation node to which the base node is a participant.

Accordingly, the process can continue in step 702 of FIG. 7 by identifying all higher-level aggregation nodes 112 in which the base node containing the requested information type is a participant. In step 704 the computer system can determine if the minimum required security level for access to identified aggregation nodes is greater than the particular user's authorized security access level. If so, then in step 706 the computer system can identify all base nodes that are also participants in that particular aggregation node. This can be accomplished, for example, by following all paths from the identified aggregation nodes back to all of their corresponding base nodes.

Once so identified, the minimum required security level for accessing base nodes of the information type that has been already accessed remains the same. However, the minimum required security level for the user to access the other participant base nodes (i.e., other than the originally requested base node) can be updated in step 708. For example, the required minimum security level to access a participant base node can be increased for a particular user to match the minimum required security level for accessing an aggregation node in which the participant base node is a participant.

The invention can be better understood by considering the following examples which are illustrative of the process.

EXAMPLE 1

Figure 8A:
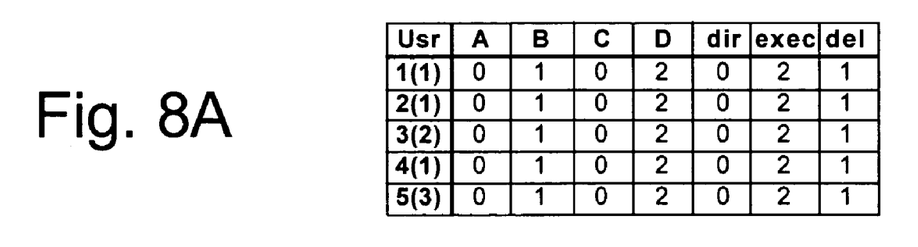
FIGS. 8A-8E show a series of tables that are useful for understanding how the inventive process can operate in one example.
Figure 8B:
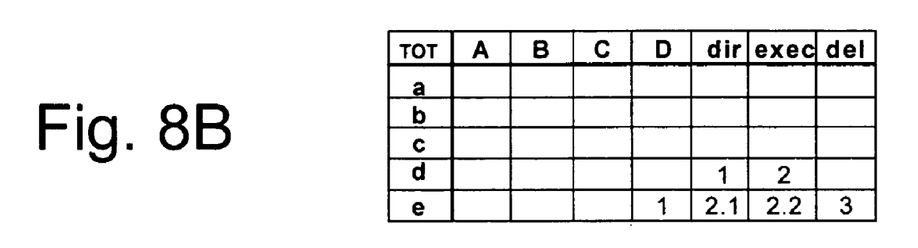

Referring to FIGS. 1 and 8, consider the case in which access authorization for users 1-5 is established in accordance with PUAT in FIG. 8A. User 2 with access level 1, U2(1) can request access to an object $102_1$ of information type A as previously described in relation to step 604. In accordance with step 606, the system consults the TOT (Temporal Order Table) in FIG. 8B and determined that the access request time does not complete a temporal access pattern. Subsequently, the request is logged in the (Temporal Access Table) as provided in step 610. In accordance with step 612 the request is tested to determine if user 2 has a sufficiently high level of access authorization. In this case $U2(1) \geq A(0)$ and therefore access is granted to the requested information type A in accordance with step 616.

Figure 8C:
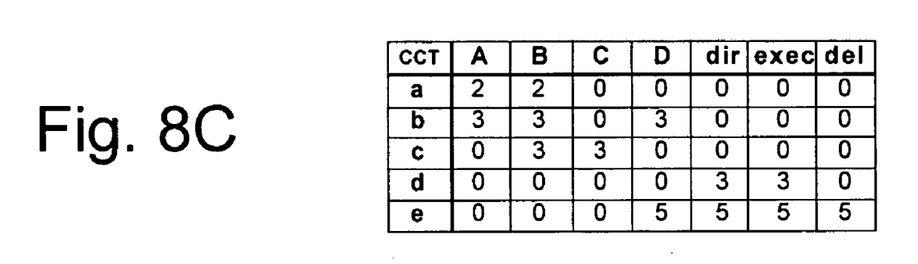

Thereafter, in step 702 the computer system can identify aggregations with object A using the CCT (Combinatorial Classification Table) in FIG. 8C. In step 704, the system checks to determine if the minimum required security level for accessing the aggregation node $112_1$ of type "a" is greater than the user's authorized security access level. In this case, the condition is satisfied since the user's authorized security access level is 1 and the minimum required level to access aggregation node $112_1$ of type "a" is equal to 2. Accordingly, the system continues to step 706 and identifies any other base nodes 110 that are part of the aggregation node $112_1$ of type "a". In this case, the system identifies information type B as being a participant in the aggregation of type "a".

Thereafter, in step 708 the PUAT in FIG. 8A is updated such that (1) the minimum security level required for accessing the originally requested base node 110 of information type "A" remains unchanged; and (2) the other participant of the aggregation node $112_1$ are updated so that their minimum required security level is increased to equal to the minimum required security level established for the aggregation node "a". This can be expressed as follows: If PUAT(i)<CCT(i) then CCT(i)→PUAT(i). The result is an updated PUAT table as shown in FIG. 8D.

Figure 8D:
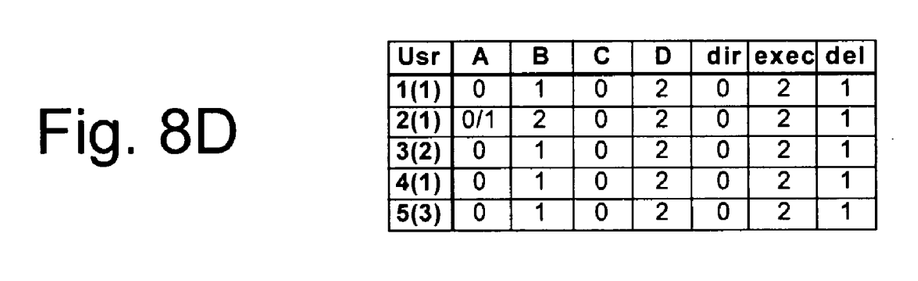

The updated table in FIG. 8D shows that for the base node 110 of information type A the minimum security access level continues to be zero. The notation 0/1 for information type A in FIG. 8D indicates that the object has a zero security level and is the first one accessed by User 2. However, with regard to User 2, the minimum security level for accessing an object of information type B in the PUAT of FIG. 8D has been increased to level 2.

Figure 8E:
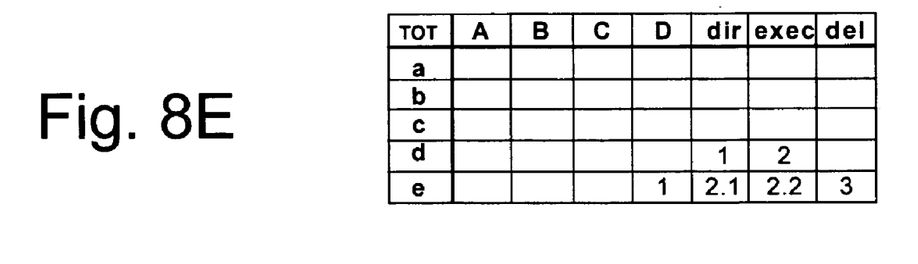

Subsequently, if User 2 with access level 1, U2(1) requests access to an object $102_2$ of information type B the system will determine in step 606 that the access request time does not complete a temporal access pattern. This is accomplished by comparing the access time to the TOT in FIG. 8E. The TOT is unchanged from its earlier state in FIG. 8B and therefore the request does not get rejected in step 606. However, in step 612, a check of the updated PUAT of FIG. 8D reveals that the minimum security level required for user 2 to access information of type B is now set to level 2. Accordingly, the request is rejected in step 614. This can be expressed as $U2(1)- \geq A(2)$ therefore deny access.

EXAMPLE 2

Figure 9A:
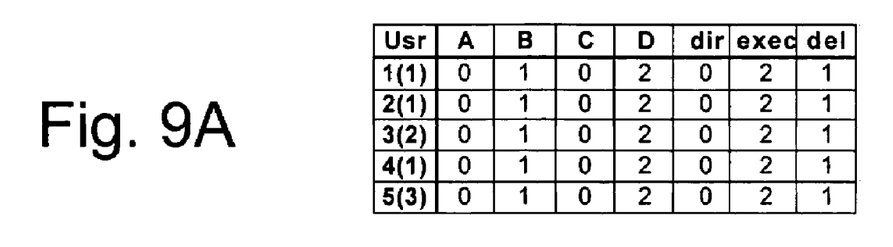
FIGS. 9A-9H show a series of tables that are useful for understanding how the inventive process can operate in a second example.
Figure 9B:
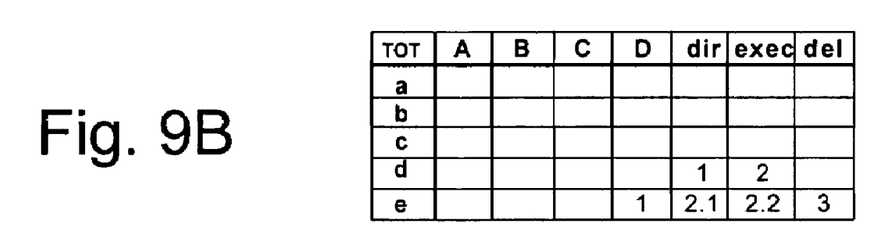

Referring to FIGS. 1 and 9, consider the case in which access authorization for users 1-5 is established in accordance with PUAT in FIG. 9A. User 3 with access level 2, U3(2) can request access to an object 102, of information type A as previously described in relation to step 604. In accordance with step 606, the system consults the TOT (Temporal Order Table) in FIG. 9B and determined that the access request time does not complete a temporal access pattern. Subsequently, the request is logged as provided in step 610. In accordance with step 612 the request is tested to determine if User 3 has a sufficiently high level of access authorization. In this case $U3(2) \geq A(0)$ and therefore access is granted to the requested object 102, in accordance with step 616.

Figure 9C:
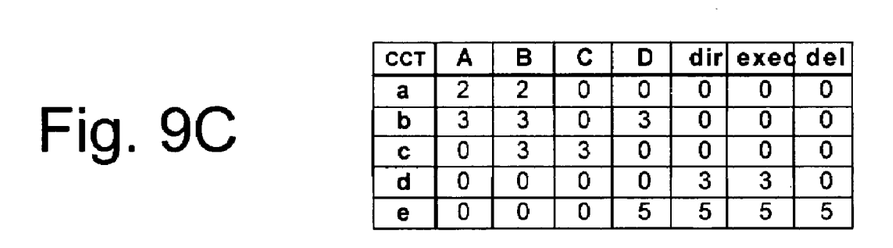

Thereafter, in step 702 the computer system can identify aggregations with object A using the CCT (Combinatorial Classification Table) in FIG. 9C. In step 704, the system checks to determine if the minimum required security level for accessing the aggregation node $112_1$ of type "a" is greater than the authorized security access level of user 3. In this case, the condition is not satisfied since the user's authorized security access level is 2 and the minimum required level to access aggregation node $112_1$ (i.e., type "a") is equal to 2. Accordingly, the system concludes that the user has an adequate security access level and continues to step 706 where it identifies any other base nodes 110 that are part of the aggregation node $112_1$. In this case, the system identifies $102_2$ (information type B) as being a participant in the aggregation.

Thereafter, in step 708 the PUAT in FIG. 9A is updated such that (1) the minimum security level required for accessing the originally requested base node 110 (information type "A") remains unchanged; and (2) the other participant of the aggregation node $112_1$ of type "a" are updated so that their minimum required security level is increased to equal to the minimum required security level established for the aggregation node $112_1$ of type "a". This can be expressed as follows: If PUAT(i)<CCT(i) then CCT(i)→PUAT(i). The result is an updated PUAT table as shown in FIG. 9D.

Figure 9D:
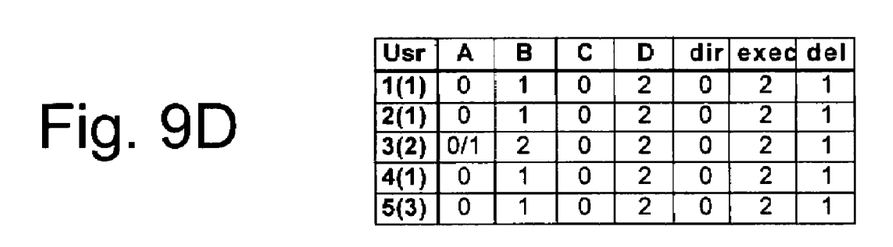

The updated table in FIG. 9D shows that for the base node 102, of information type A the minimum security access level continues to be zero for User 3. The notation 0/1 for information type A in FIG. 9D indicates that the object has a zero security level and was the first information type accessed by User 3. However, the minimum security level for accessing an object $102_2$ of information type B in the PUAT of FIG. 9D has been increased to level 2.

Figure 9E:
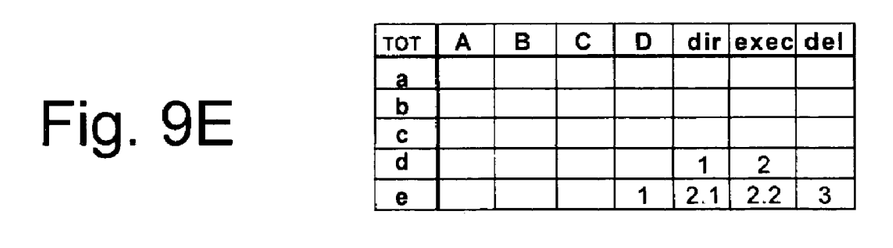

Subsequently, if User 3 with access level 2, U3(2) requests access to an object $102_4$ of information type D, the computer system will determine in step 606 that the access request time does not complete a temporal access pattern. This is accomplished by comparing the access time to the TOT in FIG. 9E. The TOT is unchanged from its earlier state in FIG. 9B and therefore the request does not get rejected in step 606. In step 612, a check of the updated PUAT of FIG. 9D reveals that the minimum security level required for user 3 to access information of type D is set (as it was initially) at level 2. Accordingly, the request is granted in step 616. This can be expressed as $U3(2) \geq D(2)$ therefore grant access.

Figure 9F:
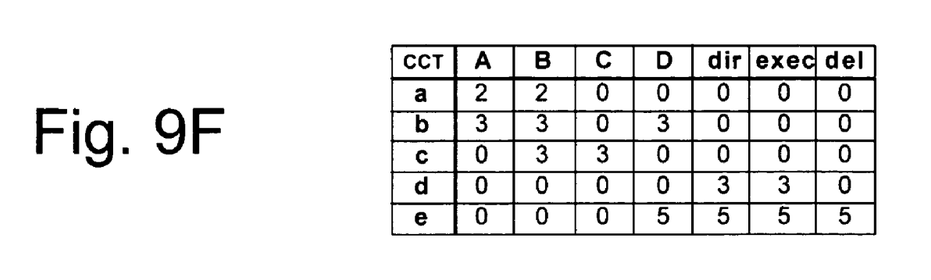

Thereafter, in step 702 the computer system can identify aggregations with the object of information type D using the CCT (Combinatorial Classification Table) in FIG. 9F. In this case node $102_4$ (information type D) is a participant in aggregation node $112_2$ of type "b". In step 704, the system checks to determine if the minimum required security level for accessing the aggregation node $112_2$ is greater than the user's authorized security access level. In this case, the condition is satisfied since the user's authorized security access level is 2 and the minimum required level to access aggregation node $112_2$ of type "b" is equal to 3. Accordingly, the system continues to step 706 and identifies any other base nodes 110 that are part of the aggregation node $112_2$ of type "b". In this case, the system identifies information types A and B (nodes $102_1$ and $102_2$) as being a participant in the aggregation of node $112_2$ of type "b".

Thereafter, in step 708 the PUAT in FIG. 9D is updated such that (1) the minimum security level required for accessing the originally requested base node $102_4$ of information type "D" remains unchanged; and (2) the other participant of the aggregation node $112_2$ of type "b" are updated so that their minimum required security level is increased to be equal to the minimum required security level established for the aggregation node $112_2$ of information type "b". This can be expressed as follows: If PUAT(i)<CCT (i) then CCT(i)→PUAT(i). The result is an updated PUAT table as shown in FIG. 9G.

Figure 9G:
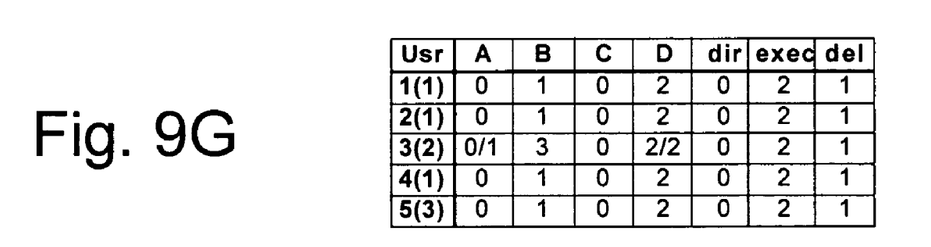

The updated table in FIG. 9G shows that for the base node $102_4$ of information type D the minimum security access level continues to be two. The notation 2/2 for information type D in FIG. 9G indicates that the object $102_4$ has a security level of 2 and is the second one accessed by User 3. However, with regard to User 3, the minimum security level for accessing an object of information type B in the PUAT of FIG. 9G has been increased to level 3.

Figure 9H:
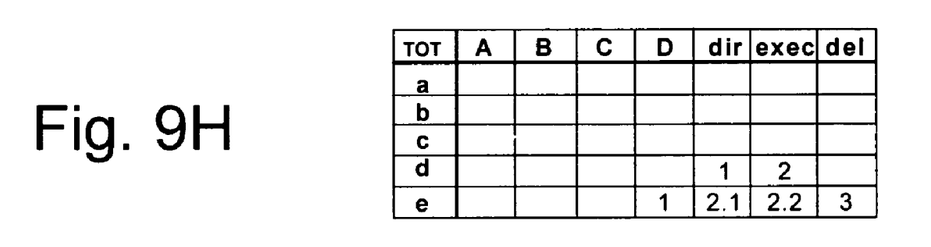

Continuing with the foregoing example, User 3 with access level 2, U3(2) can request access to an object $102_2$ of information type B. As illustrated in FIG. 9H, the access request time does not complete a temporal access pattern (step 606). However, in step 612 a comparison is made of the security authorization level for User 3 to the minimum security level required for User 3 to access as specified by the PUAT in FIG. 9G. This test reveals that User 3 (security authorization level 2) does not have a sufficiently high security level to access information type B which now has a minimum required security of 3, at least with respect to requests by user 3. This can be expressed as U3(2)-$\geq$B(3). Accordingly, the request for access is rejected in step 614.

Figure 10:
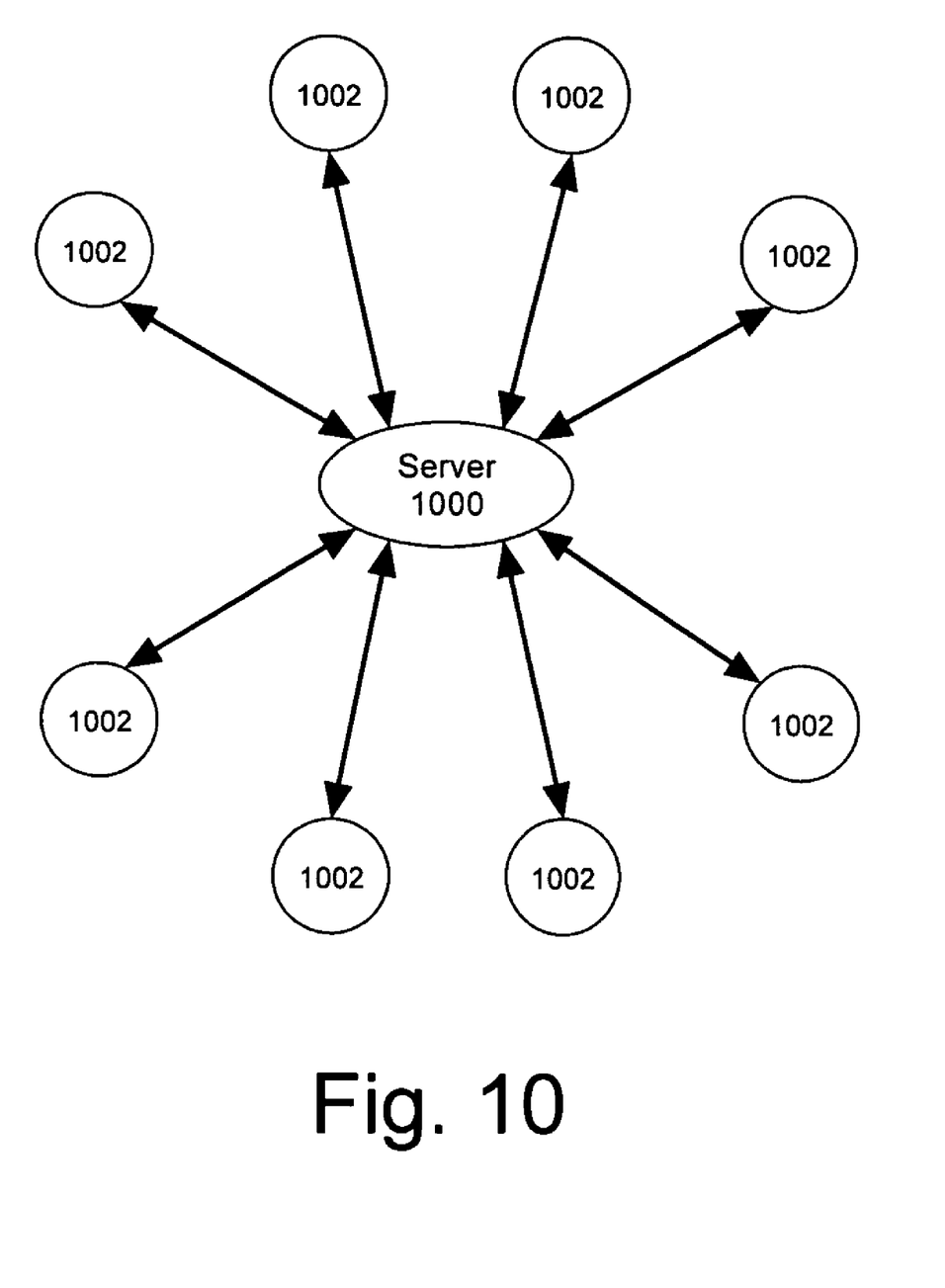
FIG. 10 is a drawing of a computer system that is useful for understanding the implementation of the inventive arrangements.

The inventive arrangements described herein can be used in conjunction with a wide variety of computer systems. These can include stand-alone computer systems, computer networks or client-server arrangements as shown in FIG. 10. The invention can be integrated within computer application software or implemented as an external component to existing software systems to provide modular accessibility. Further, the invention is not restricted to use with any particular type of software application or access request from any particular type of entity. Accordingly, to the extent that the invention has been described herein in terms of requests from users or processes, it will be understood by those skilled in the art that the techniques described herein can have much broader application. For example, the invention can be used to provide security for database access, to operating system calls, and/or to identifying hostile patterns of remote access which may be initiated by computer viruses and worms.

Referring again to FIG. 10, it will be appreciated that the present invention can be realized in software in a centralized fashion in one computer system 1000, or in a distributed fashion where different elements are spread across several interconnected computer systems 1000, 1002. Any kind of computer system or other apparatus adapted for carrying out the methods described herein is suited. A typical implementation can include a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

I claim:

1. A method for secure access to a computer system, comprising the steps of:

receiving in said computer system a request from an entity with a predetermined access level for access to a first base node representing at least one of an information type and a computer system function;

determining if said access request completes a prohibited temporal access pattern for said entity;

comparing a minimum access level established for said first base node to said predetermined access level;

granting said access request only if it does not complete a prohibited temporal access pattern for said entity, and said minimum access level for said first base node does not exceed said predetermined access level; and denying said request if said access request completes a prohibited temporal access pattern for said entity.

2. The method according to claim 1, further comprising the step of denying said request if said minimum access level for said first base node exceeds said predetermined access level for said entity.

3. The method according to claim 1, further comprising the steps of:

logically organizing said computer system in the form of a tree hierarchy having a plurality of leaf nodes and higher-level nodes;

defining a plurality of said base nodes as comprising respectively a plurality of leaf nodes of said tree hierarchy; and defining said higher-level nodes as aggregations of said base nodes.

4. The method according to claim 3 further comprising the step of identifying within said hierarchy any higher-level nodes that are aggregations comprising said first base node.

5. The method according to claim 4, further comprising the step of identifying within said hierarchy any nodes that comprise children of any generation of said higher-level nodes that are aggregations comprising said first base node.

6. The method according to claim 5, further comprising the step of updating a minimum required entity access level for any base nodes that comprise children of any generation of said higher-level nodes that are aggregations comprising said first base node.

7. The method according to claim 6, wherein said updating step further comprises the steps of:

comparing said entity's predetermined access level against the minimum required access level of said higher-level nodes that are aggregations comprising said first base node; and updating a minimum required access level of any said base node that is also a member of any aggregation comprising said first base node if a minimum required access level for said higher-level node comprising said aggregation has a required access level that is higher than said entity's predetermined access level.

8. The method according to claim 1, further comprising the steps of:
comparing said entity's predetermined access level against the minimum required access level of at least one higher-level node that is an aggregation of base nodes including said first base node; and
updating a minimum required access level of any said base node that is also a member of any aggregation comprising said first base node if a minimum required access level for said higher-level node comprising said aggregation has a required access level that is higher than said entity's predetermined access level.

9. A method for restricting access to a computer system having a plurality of logical base nodes representing at least one of an information type and a computer system function, and a plurality of higher-level nodes arranged together with said base nodes in the form of a tree hierarchy, comprising the steps of:
receiving in said computer system a request from an entity with a predetermined access level for access to a first base node;
determining if said access request completes a prohibited temporal access pattern for said entity;
comparing a minimum access level established for said first base node to said predetermined access level;
granting said access request only if it does not complete a prohibited temporal access pattern for said entity, and said minimum access level for said first base node does not exceed said predetermined access level; and
denying said request if said access request completes a prohibited temporal access pattern for said entity.

10. A secure computer system comprising:
a plurality of logical base nodes representing at least one of an information type and a computer system function;
a plurality of higher-level nodes arranged together with said base nodes in the form of a tree hierarchy;
a computer system interface capable of receiving a request from an entity with a predetermined access level for access to a first base node;
a temporal access table;
processing means programmed for comparing said access request to said temporal access table to determine if said access request completes a prohibited temporal access pattern for said entity, and for comparing a minimum access level established for said first base node to said predetermined access level; and
wherein said processing means denies said request if said access request completes a prohibited temporal access pattern for said entity and grants said access request only if it does not complete a prohibited temporal access pattern for said entity, and said minimum access level for said first base node does not exceed said predetermined access level.

11. The secure computer system according to claim 10, wherein said processing means denies said request if said minimum access level for said first base node exceeds said predetermined access level for said entity.

12. The secure computer system according to claim 10 wherein said higher-level nodes are aggregations of said base nodes.

13. The secure computer system according to claim 12 wherein said processing means identifies within said hierarchy any higher-level nodes that are aggregations comprising said first base node.

14. The secure computer system according to claim 13 wherein said computer processing means identifies within said hierarchy any nodes that comprise children of any generation of said higher-level nodes that are aggregations comprising said first base node.

15. The secure computer system according to claim 14 wherein said processing means updates a minimum required entity access level for any base nodes that comprise children of any generation of said higher-level nodes that are aggregations comprising said first base node.

16. The secure computer system according to claim 15 wherein said processing means compares said entity's predetermined access level against the minimum required access level of said higher-level nodes that are aggregations comprising said first base node; and
automatically updates a minimum required access level of any said base node that is also a member of any aggregation comprising said first base node if a minimum required access level for said higher-level node comprising said aggregation has a required access level that is higher than said entity's predetermined access level.

17. The secure computer system according to claim 10 wherein said processing means compares said entity's predetermined access level against the minimum required access level of at least one higher-level node that is an aggregation of base nodes including said first base node; and
updates a minimum required access level of any said base node that is also a member of any aggregation comprising said first base node if a minimum required access level for said higher-level node comprising said aggregation has a required access level that is higher than said entity's predetermined access level.

* * * * *